US012098847B2

(12) United States Patent
Akamatsu et al.

(10) Patent No.: US 12,098,847 B2
(45) Date of Patent: Sep. 24, 2024

(54) GAS TURBINE COMBUSTOR AND GAS TURBINE

(71) Applicant: MITSUBISHI HEAVY INDUSTRIES, LTD., Tokyo (JP)

(72) Inventors: Shinji Akamatsu, Kanagawa (JP); Naoki Abe, Kanagawa (JP); Satoshi Takiguchi, Tokyo (JP); Kei Inoue, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/027,182

(22) PCT Filed: Oct. 5, 2021

(86) PCT No.: PCT/JP2021/036757
§ 371 (c)(1),
(2) Date: Mar. 20, 2023

(87) PCT Pub. No.: WO2022/075299
PCT Pub. Date: Apr. 14, 2022

(65) Prior Publication Data
US 2023/0332771 A1 Oct. 19, 2023

(30) Foreign Application Priority Data
Oct. 7, 2020 (JP) .................................. 2020-169720

(51) Int. Cl.
*F23R 3/28* (2006.01)
*F02C 7/22* (2006.01)
(52) U.S. Cl.
CPC ................ *F23R 3/286* (2013.01); *F02C 7/22* (2013.01); *F23R 3/283* (2013.01); *F05D 2240/35* (2013.01)

(58) Field of Classification Search
CPC .................................. F23R 3/283; F23R 3/286
See application file for complete search history.

(56) References Cited

U.S. PATENT DOCUMENTS 8,113,000 B2 * 2/2012 Laster ....................... F23R 3/14
60/737
8,127,550 B2 * 3/2012 Harris, Jr. ............... F23D 14/82
60/752

(Continued)

FOREIGN PATENT DOCUMENTS

JP 11-223341 8/1999
JP 2006-78127 3/2006

(Continued)

OTHER PUBLICATIONS

International Search Report issued Dec. 7, 2021 in corresponding International (PCT) Patent Application No. PCT/JP2021/036757, with English language translation.

(Continued)

*Primary Examiner* — David P. Olynick
(74) *Attorney, Agent, or Firm* — Wenderoth, Lind & Ponack, L.L.P.

(57) ABSTRACT

A gas turbine combustor according to at least one embodiment is a gas turbine combustor that includes: a tubular member; a plurality of premixing tubes circumferentially arranged on an inner side of the tubular member, each of the plurality of premixing tubes forming an outlet portion of a premixing passage; and a base plate for supporting the plurality of premixing tubes. The base plate has: a plurality of through holes disposed corresponding to the plurality of premixing tubes, respectively, and allowing the premixing passage to pass through the base plate; and a plurality of oblique holes extending obliquely with respect to an axial (Continued)

direction of the gas turbine combustor in a region different from a region where the through holes are disposed.

5 Claims, 7 Drawing Sheets

(56) References Cited

U.S. PATENT DOCUMENTS

| | | | | |
|---|---|---|---|---|
| 8,516,819 | B2* | 8/2013 | Gambacorta | F23M 20/005 |
| | | | | 60/725 |
| 9,939,156 | B2* | 4/2018 | Miduturi | F23R 3/283 |
| 2008/0184708 | A1 | 8/2008 | Moriwaki et al. | |
| 2009/0173075 | A1 | 7/2009 | Miura et al. | |
| 2010/0011769 | A1 | 1/2010 | Gambacorta et al. | |
| 2010/0269509 | A1* | 10/2010 | Harris, Jr. | F23R 3/04 |
| | | | | 60/749 |
| 2016/0040883 | A1 | 2/2016 | Asai et al. | |
| 2016/0091207 | A1* | 3/2016 | Miyauchi | F23R 3/283 |
| | | | | 60/737 |
| 2017/0307218 | A1 | 10/2017 | Miyauchi et al. | |
| 2017/0307219 | A1 | 10/2017 | Tsunoda et al. | |
| 2020/0300471 | A1 | 9/2020 | Miyamoto et al. | |

FOREIGN PATENT DOCUMENTS

| | | |
|---|---|---|
| JP | 3864238 | 10/2006 |
| JP | 2009-133508 | 6/2009 |
| JP | 2012-154588 | 8/2012 |
| JP | 2016-38108 | 3/2016 |
| JP | 2016-61545 | 4/2016 |
| JP | 2017-180906 | 10/2017 |
| WO | 2016/056521 | 4/2016 |

OTHER PUBLICATIONS

International Preliminary Report on Patentability issued Dec. 7, 2021 in corresponding International (PCT) Patent Application No. PCT/JP2021/036757, with English language translation.
International Preliminary Report on Patentability issued Apr. 20, 2023 in corresponding International (PCT) Patent Application No. PCT/JP2021/036757, with English language translation.

* cited by examiner

View V

FIG. 6

View VI

FIG. 7

GAS TURBINE COMBUSTOR AND GAS TURBINE

TECHNICAL FIELD

The present disclosure relates to a gas turbine combustor and a gas turbine.

This application claims the priority of Japanese Patent Application No. 2020-169720 filed on Oct. 7, 2020, the content of which is incorporated herein by reference.

BACKGROUND

In a gas turbine combustor adopting a premixing method, fuel and air are mixed in a premixing tube forming a premixing passage to generate a premixed gas, the generated premixed gas is ejected from the premixing tube, and the premixed gas is burned downstream of an outlet of the premixing tube (see, for example, Patent Document 1).

CITATION LIST

Patent Literature

Patent Document 1: JP2017-180906A

SUMMARY

Technical Problem

In general, in a gas turbine combustor, a plurality of premixing tubes are arranged side by side along the circumferential direction of the gas turbine combustor. Then, the plurality of premixing tubes are supported by a combustor basket via a base plate. More specifically, the base plate is formed with a plurality of through holes where the premixing tubes penetrate, each of the premixing tubes is inserted through a corresponding one of the through holes, and an outlet-side end projects to the downstream side of the gas turbine combustor relative to the base plate.

In the gas turbine combustor having such configuration, a space is formed which is surrounded by outer peripheral surfaces of the plurality of premixing tubes, an inner peripheral surface of the combustor basket, and a downstream surface of the base plate. If the premixed gas flows back into this space and burns, the premixing tubes may be damaged. Therefore, in order to prevent the premixed gas from flowing back into this space, a plurality of air holes penetrating the base plate are provided in a region of the base plate where the premixing tubes do not penetrate, and air upstream of the base plate may be supplied from the air holes into the above-described space.

Further, in the gas turbine combustor having the above configuration, a pilot cone of a pilot nozzle exists on an inner side of the plurality of premixing tubes circumferentially arranged, and thus the cross-sectional shape of the premixing tube, which is circular near the base plate, changes to approach a partial torus towards the outlet of the premixing tube. Consequently, if the flow of air ejected from the above-described air holes becomes uneven and a region with a relatively high flow velocity and a region with a relatively low flow velocity are generated near the outlet of the premixing tube, the premixed gas flows back into the region with the relatively low flow velocity and burns, which may damage the premixing tube.

In view of the above, an object of at least one embodiment of the present disclosure is to suppress the backflow of the premixed gas in the gas turbine combustor to suppress the damage to the gas turbine combustor.

Solution to Problem (1) A gas turbine combustor according to at least one embodiment of the present disclosure includes: a tubular member; a plurality of premixing tubes circumferentially arranged on an inner side of the tubular member, each of the plurality of premixing tubes forming an outlet portion of a premixing passage; and a base plate for supporting the plurality of premixing tubes. The base plate has: a plurality of through holes disposed corresponding to the plurality of premixing tubes, respectively, and allowing the premixing passage to pass through the base plate; and a plurality of oblique holes extending obliquely with respect to an axial direction of the gas turbine combustor in a region different from a region where the through holes are disposed.

(2) A gas turbine according to at least one embodiment of the present disclosure includes: the gas turbine combustor having the above configuration (1).

Advantageous Effects

According to at least one embodiment of the present disclosure, it is possible to suppress damage to a gas turbine combustor.

DETAILED DESCRIPTION

Embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

Regarding Gas Turbine 1

Figure 1:
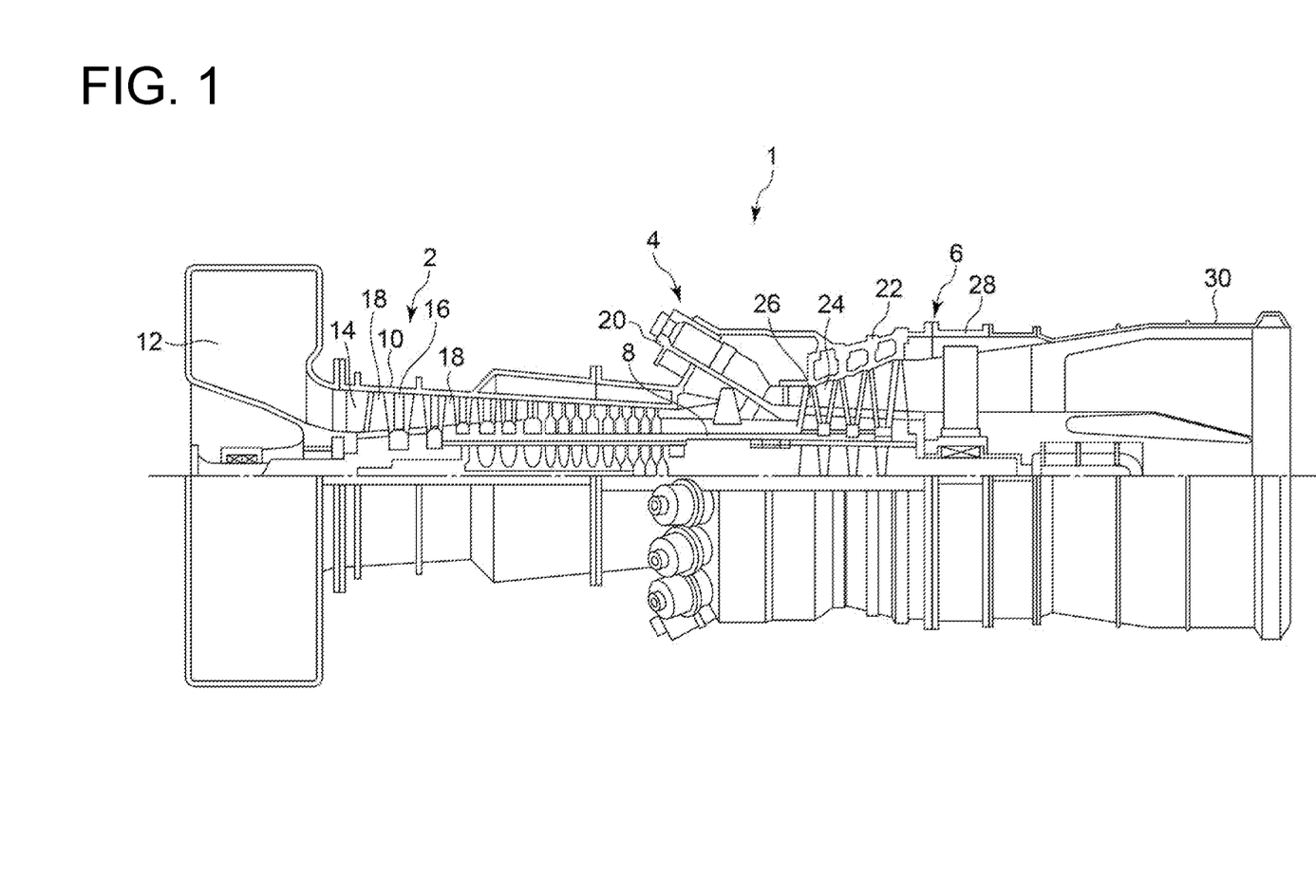
FIG. 1 is a schematic configuration view of a gas turbine according to some embodiments.

FIG. 1 is a schematic configuration view of a gas turbine according to some embodiments.

A gas turbine, which is an example of application of a gas turbine combustor according to some embodiments, will be described with reference to FIG. 1.

As shown in FIG. 1, the gas turbine 1 according to some embodiments includes a compressor 2 for producing compressed air that serves as an oxidant, a gas turbine combustor 4 for producing a combustion gas using the compressed air and fuel, and a turbine 6 configured to be rotary driven by the combustion gas. In the case of the gas turbine 1 for power generation, a generator (not illustrated) is connected to the turbine 6, so that rotational energy of the turbine 6 generates electric power. In the following description, the gas turbine combustor 4 is also simply referred to as the combustor 4.

The specific configuration example of each component in the gas turbine 1 according to some embodiments will be described.

The compressor 2 according to some embodiments includes a compressor casing 10, an air inlet 12 disposed on an inlet side of the compressor casing 10 and configured to suck in air, a rotor 8 disposed so as to penetrate both of the compressor casing 10 and a turbine casing 22 described later, and a variety of vanes disposed in the compressor casing 10. The variety of vanes include an inlet guide vane 14 disposed on the air inlet 12 side, a plurality of stator vanes 16 fixed to the compressor casing 10 side, and a plurality of rotor blade 18 implanted on the rotor 8 so as to be arranged alternately with the stator vanes 16. The compressor 2 may include other constituent elements such as an extraction chamber (not shown). In such compressor 2, the air sucked in from the air inlet 12 passes through the plurality of stator vanes 16 and the plurality of rotor blade 18 to be compressed to turn into high-temperature and high-pressure compressed air. The high-temperature and high-pressure compressed air is sent to the combustor 4 of a latter stage from the compressor 2.

The combustor 4 according to some embodiments is disposed in a casing 20. As shown in FIG. 1, a plurality of combustors 4 may be disposed in annular shape centered at the rotor 8 in the casing 20. The combustor 4 is supplied with fuel and the compressed air produced in the compressor 2, and burns the fuel to produce a combustion gas that serves as a working fluid of the turbine 6. Then, the combustion gas is sent to the turbine 6 at the latter stage from the combustor 4. The detailed configuration example of the combustor 4 according to some embodiments will be described later.

The turbine 6 according to some embodiments includes the turbine casing 22 and a variety of vanes disposed in the turbine casing 22. The variety of vanes include a plurality of stator vanes 24 fixed to the turbine casing 22 side, and a plurality of rotor blade 26 implanted on the rotor 8 so as to be arranged alternately with the stator vanes 24. The turbine 6 may include other constituent elements, such as outlet guide vanes and the like. In the turbine 6, the rotor 8 is rotary driven, as the combustion gas passes through the plurality of stator vanes 24 and the plurality of rotor blade 26. Consequently, the generator connected to the rotor 8 is driven.

An exhaust chamber 30 is connected to the downstream side of the turbine casing 22 via an exhaust casing 28. The combustion gas having driven the turbine 6 is discharged outside via the exhaust casing 28 and the exhaust chamber 30.

Regarding Combustor 4

Figure 2:
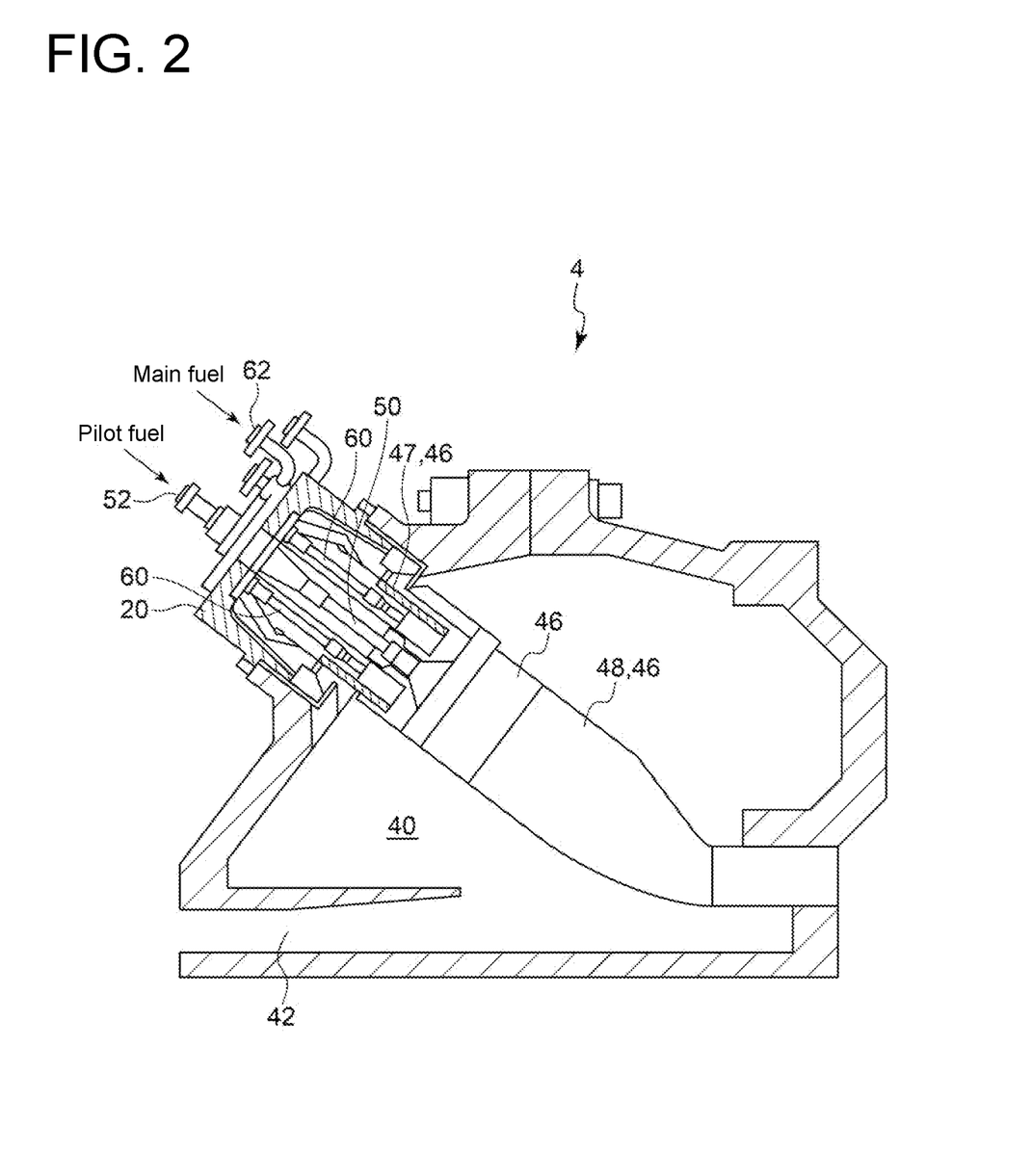
FIG. 2 is a cross-sectional view of a combustor according to some embodiments.
Figure 3:
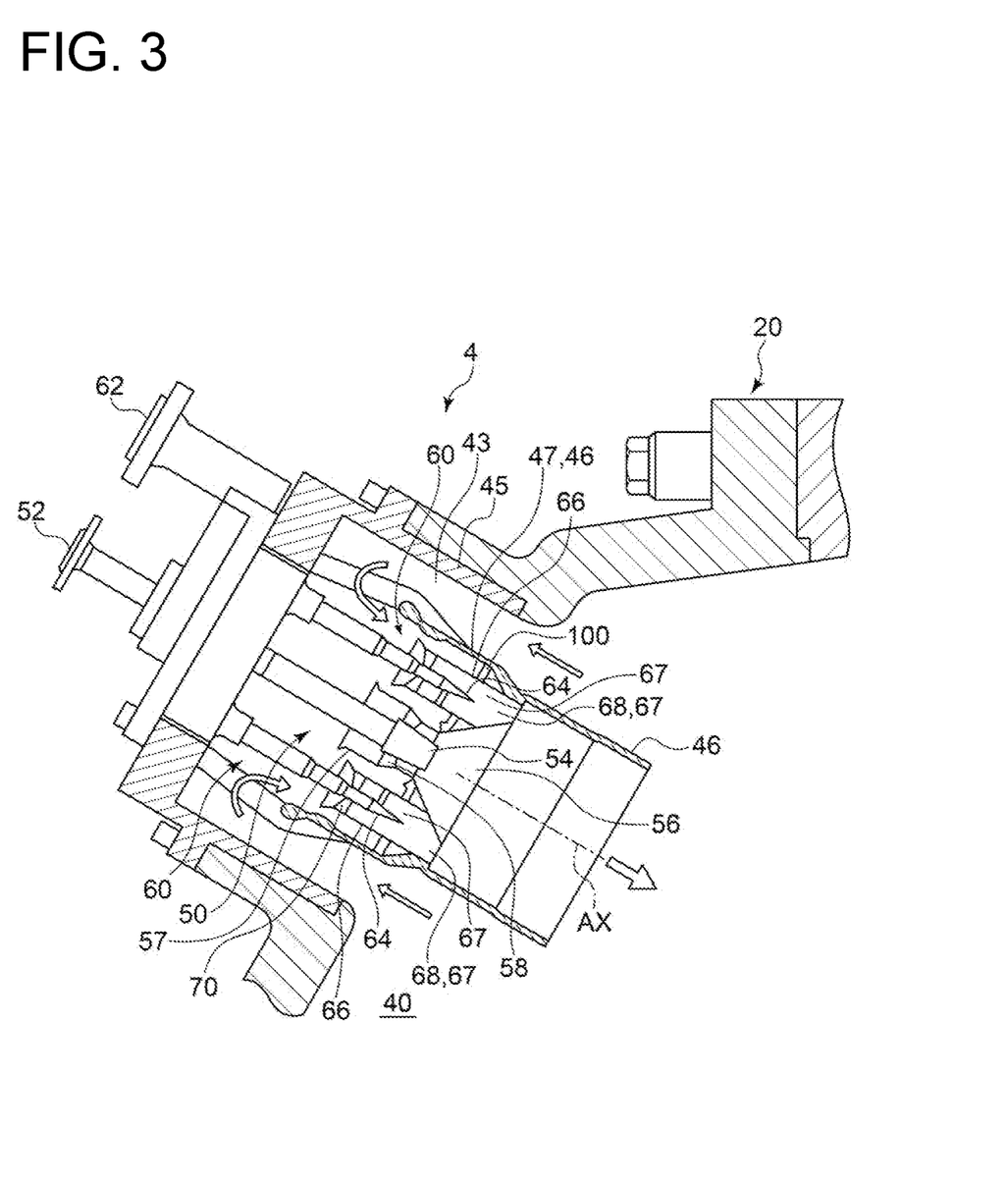
FIG. 3 is a cross-sectional view showing main parts of the combustor according to some embodiments.

FIG. 2 is a cross-sectional view of the combustor according to some embodiments. FIG. 3 is a cross-sectional view showing main parts of the combustor according to some embodiments.

The detailed configuration of the combustor 4 according to some embodiments will be described with reference to FIGS. 2 and 3.

As shown in FIGS. 2 and 3, a plurality of combustors 4 according to some embodiments are disposed in annular shape centered at the rotor 8 (see FIG. 1). Each combustor 4 includes a combustor liner 46 which is disposed in a combustor casing 40 defined by the casing 20, and a pilot combustion burner 50 and a plurality of premix combustion burners (main combustion burners) 60 disposed in the combustor liner 46. The combustor 4 further includes a combustor casing 45, which is disposed on an outer peripheral side of a combustor basket 47 of a combustor liner 46, in the casing 20. An air passage 43 through which compressed air flows is formed on an outer peripheral side of the combustor basket 47 and an inner peripheral side of the combustor casing 45.

The combustor 4 may include other constituent elements such as a bypass pipe (not shown) for allowing the combustion gas to bypass.

For example, the combustor liner 46 includes the combustor basket 47 disposed around the pilot combustion burner 50 and the plurality of premix combustion burners 60, and a transition piece 48 connected to a distal end of the combustor basket 47.

The pilot combustion burner 50 is disposed along the central axis of the combustor liner 46 (a central axis AX of the combustor 4). The plurality of premix combustion burners 60 are arranged at a distance from one another so as to surround the pilot combustion burner 50.

The pilot combustion burner 50 includes a pilot nozzle (nozzle) 54 connected to a fuel port 52, a pilot burner cylinder 57 disposed so as to surround the pilot nozzle 54, and a swirler 58 disposed on the outer circumference of the pilot nozzle 54.

The premix combustion burner 60 includes a main nozzle (nozzle) 64 connected to a fuel port 62, a main burner cylinder 66 disposed so as to surround the nozzle 64, and a swirler 70 disposed on the outer circumference of the nozzle 64. In the following description, the main burner cylinder 66 is also referred to as the premixing tube 66.

That is, the combustor 4 according to some embodiments includes the plurality of premixing tubes 66 circumferentially arranged on the inner side of the combustor basket 47 serving as a tubular member, and each forming an outlet portion 68 of a premixing passage 67.

An extension direction of the cylindrical combustor basket 47 coincides with an extension direction of the central axis AX of the combustor 4. In the following description, the extension direction of the central axis AX of the combustor 4 is also simply referred to as the axial direction. Of the axial direction, a direction downstream of the flow of the premixed gas is also simply referred to as a downstream side, and a direction upstream of the flow of the premixed gas is also simply referred to as an upstream side.

Further, in the following description, the circumferential direction centered on the central axis AX of the combustor 4 is also simply referred to as the circumferential direction, and the radial direction centered on the central axis AX of the combustor 4 is also simply referred to as the radial direction.

Regarding Base Plate 100

Figure 4:
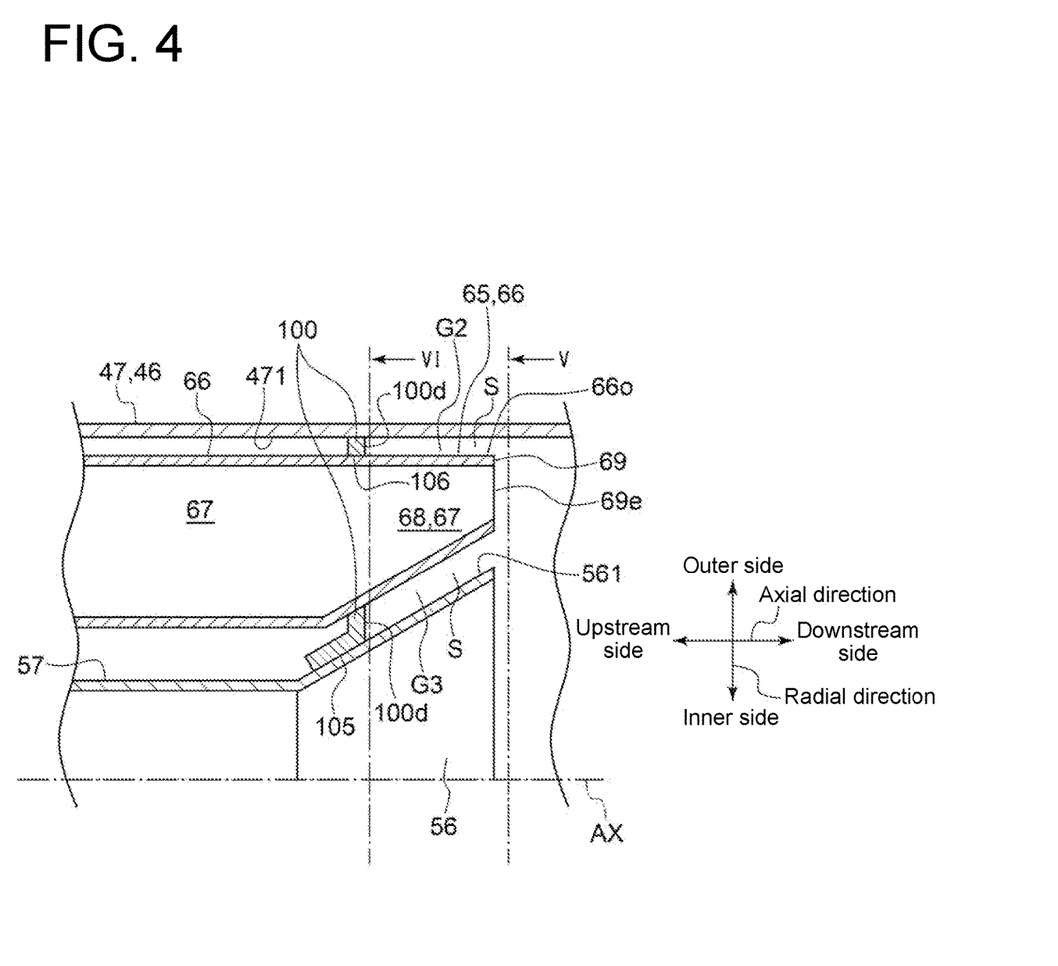
FIG. 4 is a schematic cross-sectional view of a combustor basket.

FIG. 4 is a schematic cross-sectional view of the combustor basket, and schematically shows a cross section along the radial direction in the vicinity of the base plate.

Figure 5:
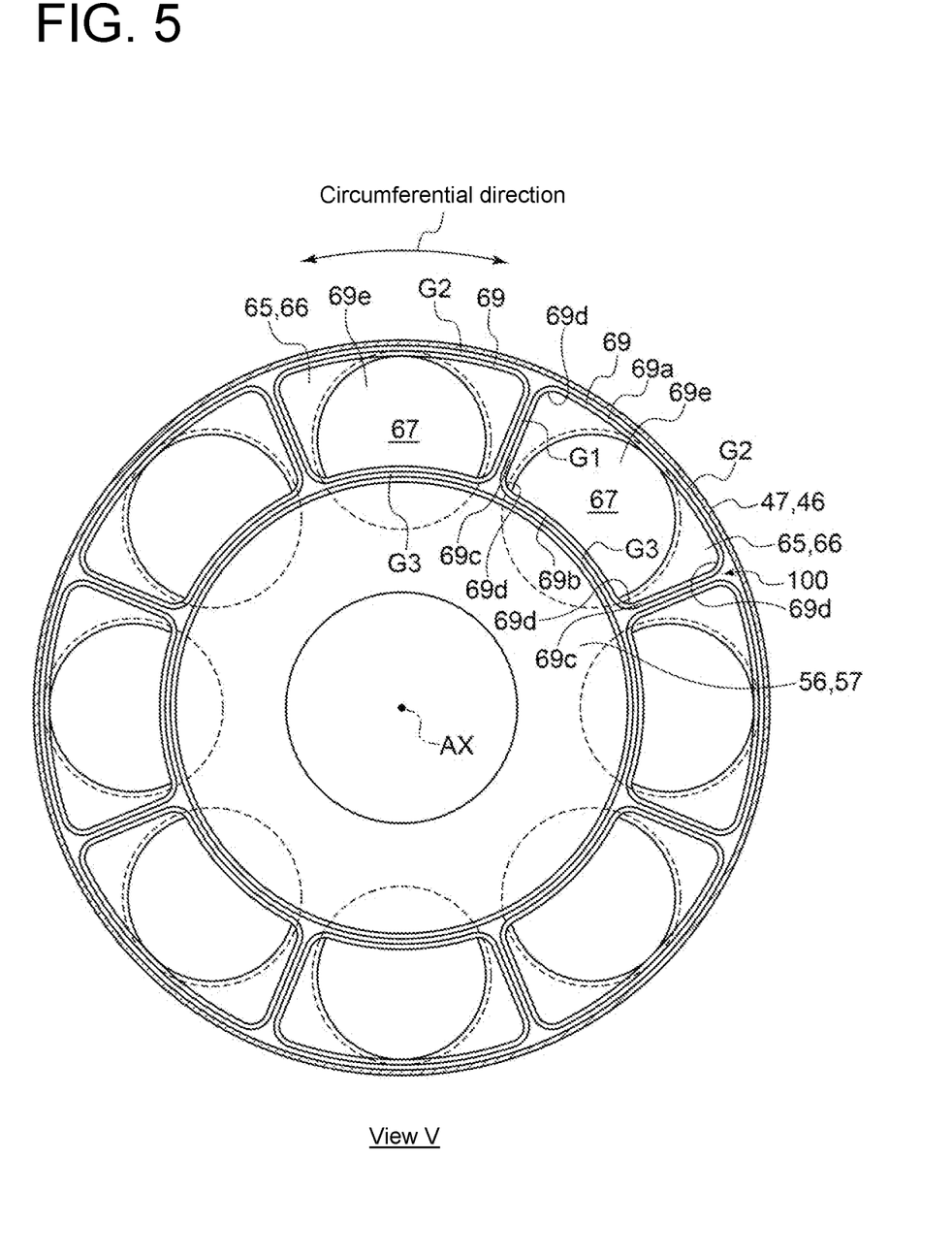
FIG. 5 is an arrow cross-sectional view taken along line V in FIG. 4.

FIG. 5 is an arrow cross-sectional view taken along line V in FIG. 4.

Figure 6:
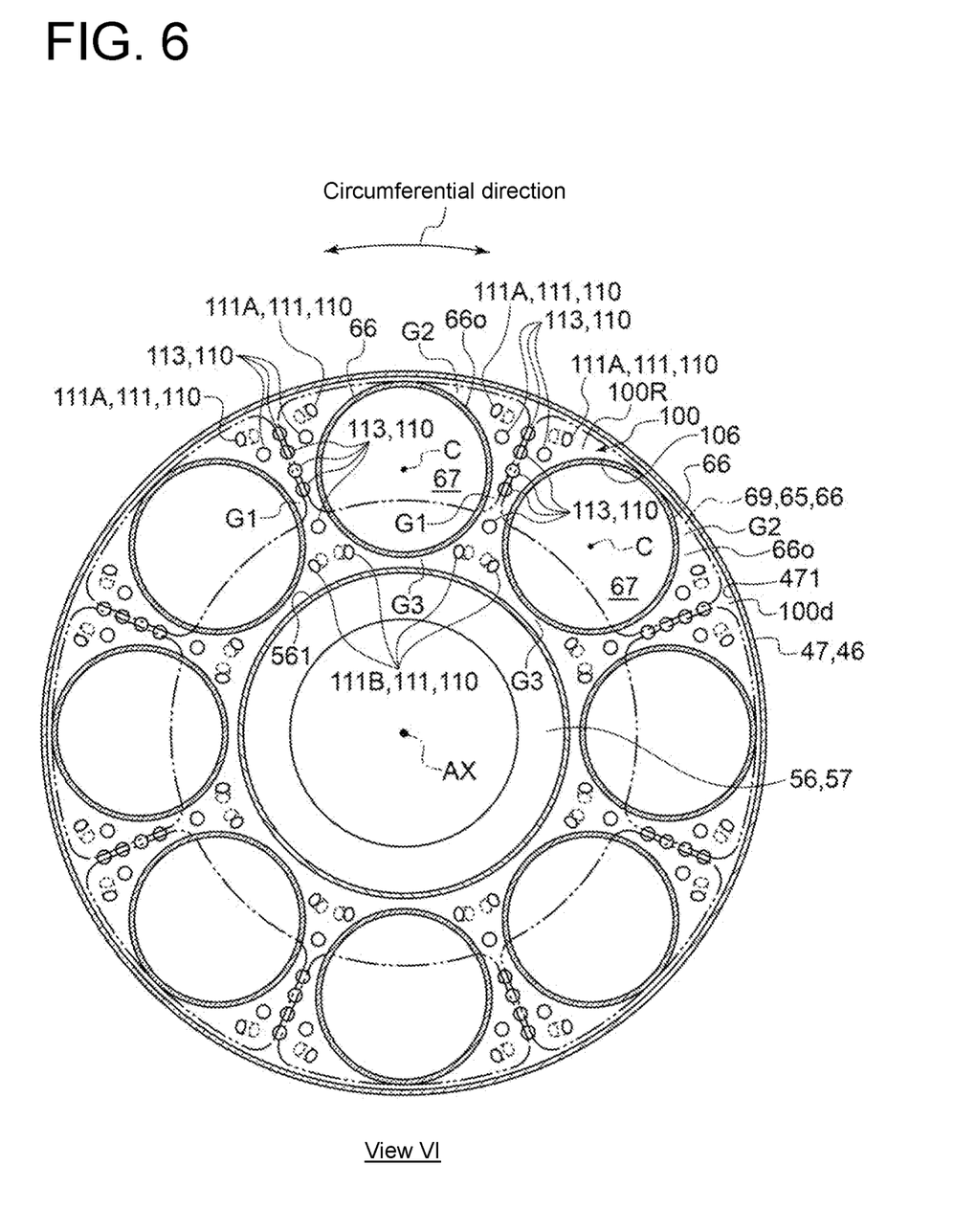
FIG. 6 is an arrow cross-sectional view taken along line VI in FIG. 4.

FIG. 6 is an arrow cross-sectional view taken along line VI in FIG. 4.

Figure 7:
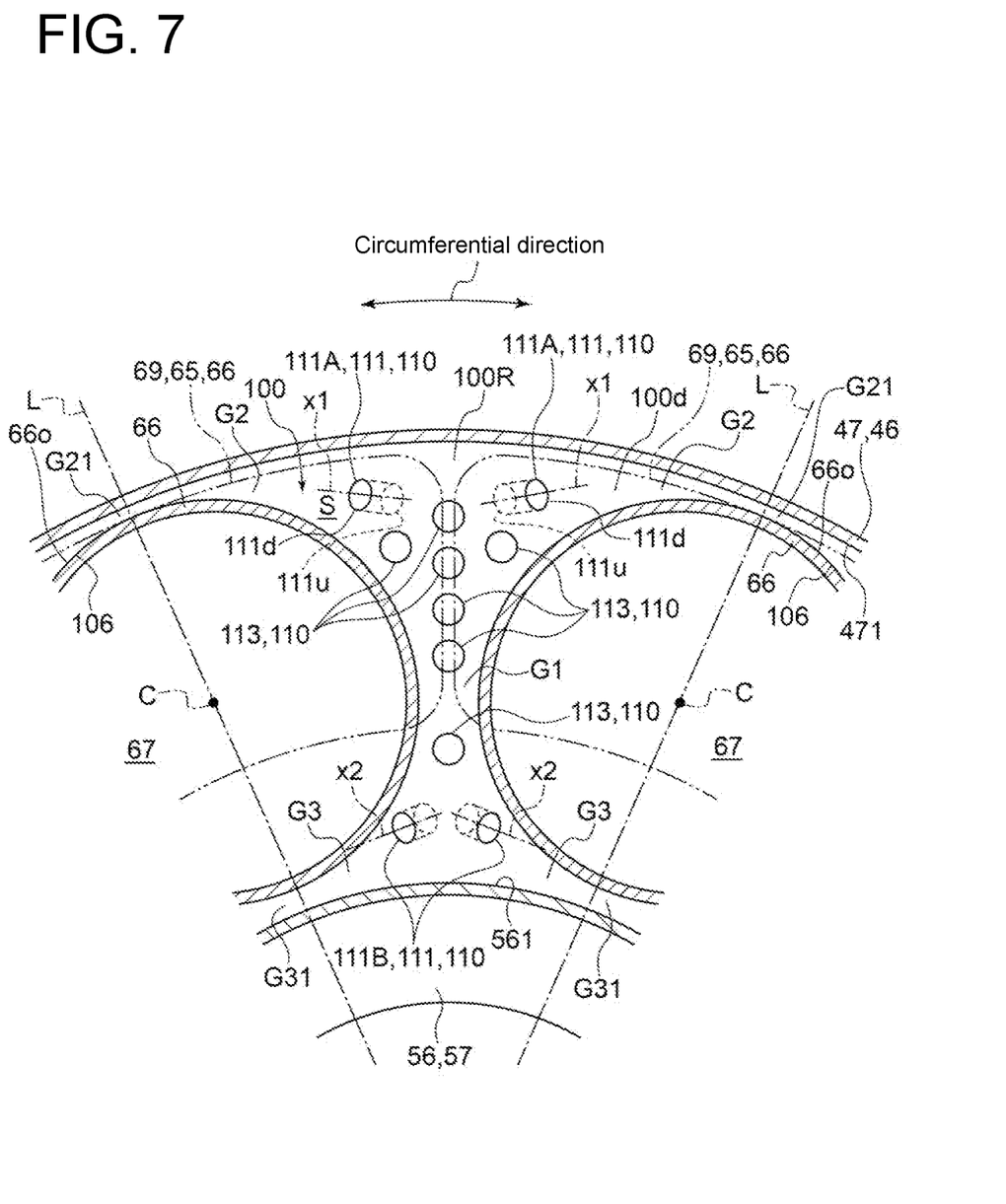
FIG. 7 is a partially enlarged view of FIG. 6.

FIG. 7 is a partially enlarged view of FIG. 6.

In FIGS. 4 to 7, the nozzle 54, 64, or the like is not depicted for the sake of descriptive convenience. Further, in FIG. 7, double-dotted chain lines represent the shape of an outer peripheral edge of an outlet opening forming portion 69 of an extension section 65 described later, which appears in V arrow view of FIG. 4.

The combustor 4 according to some embodiments includes a base plate 100 for supporting the plurality of premixing tubes. The base plate 100 according to some embodiments is configured to support the premixing tubes 66 and the pilot burner cylinder 57 in the combustor basket 47. The base plate 100 according to some embodiments is configured to support, of the pilot burner cylinder 57, a pilot cone portion 56 formed downstream of the pilot burner cylinder 57, but may be configured to support the pilot burner cylinder 57 upstream of the pilot cone portion 56.

More specifically, the base plate 100 according to some embodiments is formed with a pilot burner support hole 105 and a plurality of premixing tube support holes 106, which are through holes penetrating the base plate 100. That is, the base plate 100 according to some embodiments has the pilot burner support hole 105 disposed corresponding to the pilot burner cylinder 57. The base plate 100 according to some embodiments has the plurality of premixing tube support holes 106 which are a plurality of through holes disposed corresponding to the plurality of premixing tubes 66, respectively, and allowing the premixing passage 67 to pass through the base plate 100.

The pilot burner cylinder 57 is inserted into the pilot burner support hole 105. The premixing tube 66 is inserted into each of the plurality of premixing tube support holes 106.

The pilot burner cylinder 57 is joined to the base plate 100 according to some embodiments, for example by welding. The plurality of premixing tubes 66 are joined to the base plate 100 according to some embodiments, for example by welding.

The base plate 100 according to some embodiments is fixed to the combustor basket 47 by joining an outer peripheral portion of the base plate 100 to an inner peripheral surface of the combustor basket 47, for example by welding.

In some embodiments, a region of the premixing tube 66 forming the outlet portion 68 of the premixing passage 67 (for example, a region projecting to the downstream side of the base plate 100) is also referred to as the extension section 65.

In the base plate 100 according to some embodiments, a plurality of air holes 110 penetrating the base plate 100 are formed in a region 100R different from the region where the pilot burner support hole 105 and the premixing tube support holes 106 are disposed. Some of the plurality of air holes 110 are oblique holes 111 extending obliquely with respect to the axial direction, and the rest are parallel holes 113 extending parallel to the axial direction.

The air holes 110 will be described later in detail.

Regarding Shape of Extension Section 65

In the combustor 4 according to some embodiments, since the pilot cone portion 56 of the pilot burner cylinder 57 exists on the inner side of the plurality of premixing tubes 66 circumferentially arranged, the cross-sectional shape of the premixing tube 66, which is circular near the base plate 100, continuously changes to approach a partial torus towards the outlet (the outlet opening forming portion 69 of the extension section 65) of the premixing passage 67. That is, the outlet opening forming portion 69 of the extension section 65 includes a first circumferential edge 69a having an arc shape on the radially outer side, a second circumferential edge 69b having an arc shape on the radially inner side, and a pair of radial edges 69c extending radially to connect a circumferential end of the first circumferential edge 69a and a circumferential end of the second circumferential edge 69b. As shown in FIGS. 6 and 7, a corner 69d connecting the radial edge 69c to the first circumferential edge 69a and the second circumferential edge 69b is preferably rounded.

In the combustor 4 according to some embodiments, in order to secure the area of the outlet opening of the premixing passage 67, a gap G1 between the premixing tubes 66 adjacent in the circumferential direction, a gap G2 between the premixing tube 66 and the combustor basket 47, or a gap G3 between the premixing tube 66 and the pilot cone portion 56 tends to decrease toward the downstream side.

In the combustor 4 having the above configuration, the high-temperature and high-pressure compressed air produced in the compressor 2 is supplied into the combustor casing 40 from the casing inlet 42 (see FIG. 2), and further flows into the premixing tube 66 from the combustor casing 40 via the air passage 43. Then, the compressed air and the fuel supplied from the fuel port 62 are premixed in the premixing tube 66. At this time, the premixed gas mainly forms a swirl flow by the swirler 70, and flows into the combustor liner 46. Further, the compressed air and the fuel injected from the pilot combustion burner 50 via the fuel port 52 are mixed in the combustor liner 46, and ignited by a pilot light (not shown) and burned, thereby generating a combustion gas. At this time, a part of the combustion gas diffuses to the surroundings with flames, thereby igniting and burning the premixed gas flowing into the combustor liner 46 from each premix combustion burner 60. That is, the pilot flame due to the pilot fuel injected from the pilot combustion burner 50 can secure flames for performing stable combustion of premixed gas (premixed fuel) from the premix combustion burner 60.

The combustor 4 having the above configuration is formed with a space S having the above-described gap G1, G2, G3, that is, the space S which is surrounded by outer circumferential surfaces 66o of the plurality of premixing tubes 66, an inner circumferential surface 471 of the combustor basket 47, and a downstream surface 100d of the base plate 100.

If the premixed gas flows back into the space S and burns, the premixing tube 66 may be damaged (burned out).

Therefore, in order to prevent the premixed gas from flowing back into the space S, in the combustor 4 according to some embodiments, the plurality of air holes 110 penetrating the base plate 100 are provided in the region 100R of the base plate 100 where neither the premixing tube 66 nor the pilot burner cylinder 57 penetrates, and air upstream of the base plate 100 is supplied from the air holes 110 into the above-described space S.

However, as described above, in the combustor 4 having the above configuration, the cross-sectional shape of the premixing tube 66, which is circular near the base plate 100, continuously changes to approach the partial torus towards the outlet opening forming portion 69 of the extension section 65 which is the outlet of the premixing passage 67.

Consequently, if the flow of air (dilution air) ejected from the above-described air holes 110 becomes uneven and a region with a relatively high flow velocity of dilution air and a region with a relatively low flow velocity of dilution air are generated in the downstream region of the above-described space S, backfire is caused in which the premixed gas flows back into the region with the relatively low flow velocity and burns, which may damage the premixing tube 66.

If dilution air can be ejected from the above-described air holes 110 toward the region with the relatively low flow velocity, it is possible to suppress the decrease in flow velocity of dilution air in the downstream region of the above-described space S. However, in the region 100R of the base plate 100 where neither the premixing tube 66 nor the pilot burner cylinder 57 penetrates, a region where it is difficult to provide the air holes 110 exists for the reason that, for example, the gap between the premixing tube 66 and the combustor basket 47 is narrow or the gap between the premixing tube 66 and the pilot burner cylinder 57 is narrow. That is, there are restrictions on the arrangement of the air holes 110 in the base plate 100.

With the combustor 4 according to some embodiments, some of the plurality of air holes 110 are the oblique holes 111 extending obliquely with respect to the axial direction. Therefore, with the combustor 4 according to some embodiments, although there are the restrictions on the arrangement of the air holes 110 in the base plate 100, the provision of the oblique holes 111 makes it possible to supply dilution air to the desired region. Thus, it is possible to suppress that the premixed gas flows back into the space S surrounded by the outer circumferential surfaces 66o of the plurality of premixing tubes 66, the inner circumferential surface 471 of the combustor basket 47, and the downstream surface 100d of the base plate 100 and it is possible to suppress the damage to the premixing tube due to backfire, making it possible to suppress the damage to the gas turbine combustor.

Further, in the gas turbine 1 including the combustor 4 according to some embodiments, it is possible to suppress the damage to the combustor 4 and it is possible to improve the reliability of the gas turbine 1.

Regarding Oblique Hole 111

In the combustor 4 according to some embodiments, the plurality of oblique holes 111 are preferably formed in a region between the two premixing tube support holes 106 adjacent in the circumferential direction.

In the combustor 4 according to some embodiments, the plurality of oblique holes 111 preferably include first holes 111A each of which is positioned radially outward of a central position C of the premixing tube support hole 106, and extends obliquely with respect to the axial direction and radially outward from an upstream end 111u toward a downstream end 111d. That is, in the combustor 4 according to some embodiments, a central axis x1 of the first hole 111A extends obliquely with respect to the axial direction and radially outward from the upstream side toward the downstream side.

As described above, in the combustor 4 according to some embodiments, the gap G2 between the premixing tube 66 and the combustor basket 47 tends to decrease toward the downstream side. Therefore, it becomes difficult for dilution air to flow in the gap G2 between the premixing tube 66 and the combustor basket 47, and the flow velocity of dilution air in the gap between the premixing tube and the combustor basket tends to decrease.

In the combustor 4 according to some embodiments, the diluted air blown out from the first holes 111A flows radially outward, and thus easily flows into the gap G2 between the premixing tube 66 and the combustor basket 47. Thus, it is possible to suppress the decrease in flow velocity of dilution air in the gap G2, and it is possible to suppress that the premixed gas flows back into the gap G2.

In the combustor 4 according to some embodiments, each of the first holes 111A preferably extends obliquely with respect to the axial direction and toward a central position of an outlet opening 69e of the premixing tube 66 corresponding to the first hole 111A among the plurality of premixing tubes 66, in the circumferential direction, from the upstream end 111u toward the downstream end 111d. That is, in the combustor 4 according to some embodiments, the central axis x1 of the first hole 111A extends obliquely with respect to the axial direction and toward the central position of the outlet opening 69e of the premixing tube 66 corresponding to the first hole 111A, in the circumferential direction, from the upstream side toward the downstream side.

The premixing tube 66 corresponding to the first hole 111A is the premixing tube 66 forming the gap G2 to which the dilution air blown out from the first hole 111A is supplied among the plurality of gaps G2 with the combustor basket 47 respectively formed corresponding to the plurality of premixing tubes 66.

As described above, in the combustor 4 according to some embodiments, the gap G2 between the premixing tube 66 and the combustor basket 47 tends to decrease toward the downstream side. Therefore, it becomes difficult for dilution air to flow in the gap G2 between the premixing tube 66 and the combustor basket 47. In particular, among the circumferential positions of the gap G2, a region G21 on and near an extension line of a line segment L connecting the central axis AX of the combustor 4 and the central position C of each premixing tube support hole 106 has a shortest distance between the outer circumferential surface 66o of the premixing tube 66 and the inner circumferential surface 471 of the combustor basket 47, and is the farthest from a region of the base plate 100 where the air holes 110 can be arranged, compared to a region of the gap G2 other than the above-described region G21. Thus, in the above-described region G21, the flow velocity of dilution air tends to be lower than in the region of the gap G2 other than the above-described region G21, and this tendency becomes more pronounced toward the downstream side.

In the combustor 4 according to some embodiments, since the first hole 111A is configured to extend obliquely with respect to the axial direction in the circumferential direction as described above, dilution air can be blown out from the first hole 111A toward the downstream region in the above-described gap G2. Thus, the flow velocity of dilution air in the above-described region G21 can be ensured in the vicinity of the outlet opening 69e of the premixing tube 66, and it is possible to suppress that the premixed gas flows back into the region G21.

In the combustor 4 according to some embodiments, at least one first hole 111A is preferably provided for the one premixing tube 66. In the combustor 4 according to some embodiments, for example, as shown in FIGS. 6 and 7, for the one premixing tube 66, two (a pair of) first holes 111A may be provided across the premixing tube 66. The pair of first holes 111A may be not less than two pairs.

The pair of first holes 111A arranged across the premixing tube 66 have opposite inclination directions in the circumferential direction, and are preferably inclined toward the central position of the outlet opening 69e of the premixing tube 66.

In the combustor 4 according to some embodiments, at least some oblique holes 111 of the plurality of oblique holes 111 may be disposed in a region of the base plate 100 overlapping the outlet openings 69e of the premixing tubes 66, when viewed from the downstream side. That is, in the combustor 4 according to some embodiments, for example, as shown in FIG. 7, the first holes 111A may be formed at positions where the first holes 111A are hidden by the extension sections 65 of the premixing tubes 66, when viewed from the downstream side.

Consequently, the oblique hole 111 is arranged at a position relatively close to the region where the flow velocity of the dilution air tends to decrease, such as the above-described gap G2, the dilution air blown out from the oblique hole 111 easily flows into the region where the flow velocity of the dilution air tends to decrease. Thus, it is possible to suppress the decrease in flow velocity of dilution air in the region, and it is possible to suppress that the premixed gas flows back into the region.

In the combustor 4 according to some embodiments, the plurality of oblique holes 111 preferably include second holes 111B each of which is positioned radially inward of the central position C of the premixing tube support hole 106, and extends obliquely with respect to the axial direction and radially inward from the upstream end 111u toward the downstream end 111d. That is, in the combustor 4 according to some embodiments, a central axis x2 of the second hole 111B extends obliquely with respect to the axial direction and radially inward from the upstream side toward the downstream side.

As described above, in the combustor 4 according to some embodiments, the gap G3 between the premixing tube 66 and the pilot cone portion 56 tends to decrease toward the downstream side. Therefore, it becomes difficult for dilution air to flow in the gap G3 between the premixing tube 66 and the pilot cone portion 56, and the flow velocity of dilution air in the gap G3 tends to decrease.

In the combustor 4 according to some embodiments, the diluted air blown out from the second holes 111B flows radially inward, and thus easily flows into the gap G3 between the premixing tube 66 and the pilot cone portion 56. Thus, it is possible to suppress the decrease in flow velocity of dilution air in the gap G3, and it is possible to suppress that the premixed gas flows back into the gap G3.

In the combustor 4 according to some embodiments, each of the second holes 111B preferably extends obliquely with respect to the axial direction and toward the central position of the outlet opening 69e of the premixing tube 66 corresponding to the second hole 111B among the plurality of premixing tubes 66, in the circumferential direction, from the upstream end 111u toward the downstream end 111d. That is, in the combustor 4 according to some embodiments, the central axis x2 of the second hole 111B extends obliquely with respect to the axial direction and toward the central position of the outlet opening 69e of the premixing tube 66 corresponding to the second hole 111B, in the circumferential direction, from the upstream side toward the downstream side.

The premixing tube 66 corresponding to the second hole 111B is the premixing tube 66 forming the gap G3 to which the dilution air blown out from the second hole 111B is supplied among the plurality of gaps G3 with the pilot cone portion 56 respectively formed corresponding to the plurality of premixing tubes 66.

As described above, in the combustor 4 according to some embodiments, the gap G3 between the premixing tube 66 and the pilot cone portion 56 tends to decrease toward the downstream side. Therefore, it becomes difficult for dilution air to flow in the gap G3 between the premixing tube 66 and the pilot cone portion 56. In particular, among the circumferential positions of the gap G3, a region G31 near an the line segment L connecting the central axis AX of the combustor 4 and the central position C of each premixing tube support hole 106 has a shortest distance between an outer circumferential surface 66o of the premixing tube 66 and the inner circumferential surface 561 of the pilot cone portion 56, and is the farthest from a region of the base plate 100 where the air holes 110 can be arranged, compared to a region of the gap G3 other than the above-described region G31. Thus, in the above-described region G31, the flow velocity of dilution air tends to be lower than in the region of the gap G3 other than the above-described region G31, and this tendency becomes more pronounced toward the downstream side.

In the combustor 4 according to some embodiments, since the second hole 111B is configured to extend obliquely with respect to the axial direction in the circumferential direction as described above, dilution air can be blown out from the second hole 111B toward the downstream region in the above-described gap G3. Thus, the flow velocity of the dilution air in the above-described region G31 can be ensured in the vicinity of the outlet opening 69e of the premixing tube 66, and it is possible to suppress that the premixed gas flows back into the region G31.

In the combustor 4 according to some embodiments, at least one second hole 111B is preferably provided for the one premixing tube 66. In the combustor 4 according to some embodiments, for example, as shown in FIGS. 6 and 7, for the one premixing tube 66, two (a pair of) second holes 111B may be provided across the premixing tube 66. The pair of second holes 111B may be not less than two pairs.

The pair of second holes 111B arranged across the premixing tube 66 have opposite inclination directions in the circumferential direction, and are preferably inclined toward the central position of the outlet opening 69e of the premixing tube 66.

In the combustor 4 according to some embodiments, for example, as can be seen by comparing FIGS. 5 and 6, the second holes 111B may be formed at positions where the second holes 111B are hidden by the pilot cone portion 56, when viewed from the downstream side.

The present disclosure is not limited to the above-described embodiments, and also includes an embodiment obtained by modifying the above-described embodiments or an embodiment obtained by combining these embodiments as appropriate.

The contents described in the above embodiments would be understood as follows, for instance.

(1) A gas turbine combustor 4 according to at least one embodiment of the present disclosure is a gas turbine combustor 4 that includes: a tubular member (combustor basket 47); a plurality of premixing tubes 66 circumferentially arranged on an inner side of the tubular member (combustor basket 47), each of the plurality of premixing tubes 66 forming an outlet portion 68 of a premixing passage 67; and a base plate 100 for supporting the plurality of premixing tubes 66. The base plate 100 has: a plurality of through holes (premixing tube support holes 106) disposed corresponding to the plurality of premixing tubes 66, respectively, and allowing the premixing passage 67 to pass through the base plate 100; and a plurality of oblique holes 111 extending obliquely with respect to an axial direction of the gas turbine combustor 4 in a region 100R different from a region where the through holes (premixing tube support holes 106) are disposed.

With the above configuration (1), although there are the restrictions on the arrangement of the air holes 110 in the base plate 100, the provision of the oblique holes 111 makes it possible to supply dilution air to the desired region. Thus, it is possible to suppress that the premixed gas flows back into the space S surrounded by the outer circumferential surfaces 66o of the plurality of premixing tubes 66, the inner circumferential surface 471 of the combustor basket 47, and the downstream surface 100d of the base plate 100 and it is possible to suppress the damage to the premixing tube 66 due to backfire, making it possible to suppress the damage to the gas turbine combustor 4.

(2) In some embodiments, in the above configuration (1), the plurality of oblique holes 111 preferably include first holes 111A each of which is positioned radially outward of a central position C of a corresponding one of the plurality of through holes (premixing tube support holes 106), and extends obliquely with respect to the axial direction and radially outward from an upstream end 111u toward a downstream end 111d.

With the above configuration (2), the diluted air blown out from the first holes 111A flows radially outward, and thus easily flows into the gap G2 between the premixing tube 66 and the combustor basket 47. Thus, it is possible to suppress the decrease in flow velocity of dilution air in the gap G2, and it is possible to suppress that the premixed gas flows back into the gap G2.

(3) In some embodiments, in the above configuration (2), each of the first holes 111A preferably extends obliquely with respect to the axial direction and toward a central position of an outlet opening 69e of a premixing tube 66 corresponding to each of the first holes 111A among the plurality of premixing tubes 66, in a circumferential direction of the combustor 4, from the upstream end 111u toward the downstream end 111d.

With the above configuration (3), the dilution air can be blown out from the first hole 111A toward the relatively small gap G2 between the outer circumferential surface 66o of the premixing tube 66 and the inner circumferential surface 471 of the combustor basket 47. Thus, it is possible to ensure the flow velocity of dilution air in the gap G2, and it is possible to suppress that the premixed gas flows back into the gap G2.

(4) In some embodiments, in any one of the above configurations (1) to (3), the plurality of oblique holes 111 preferably include second holes 111B each of which is positioned radially inward of a central position C of a corresponding one of the plurality of through holes (premixing tube support holes 106), and extends obliquely with respect to the axial direction and radially inward from an upstream end 111u toward a downstream end 111d.

With the above configuration (4), the diluted air blown out from the second holes 111B flows radially inward, and thus easily flows into the gap G3 between the premixing tube 66 and the pilot cone portion 56. Thus, it is possible to suppress the decrease in flow velocity of dilution air in the gap G3, and it is possible to suppress that the premixed gas flows back into the gap G3.

(5) In some embodiments, in the above configuration (4), each of the second holes 111B preferably extends obliquely with respect to the axial direction and toward a central position of an outlet opening 69e of a premixing tube 66 corresponding to each of the second holes 111B among the plurality of premixing tubes 66, in a circumferential direction of the combustor 4, from the upstream end 111u toward the downstream end 111d.

With the above configuration (5), the dilution air can be blown out from the second hole 111B toward the relatively small gap G3 between the outer circumferential surface 66o of the premixing tube 66 and the inner circumferential surface 56I of the pilot cone portion 56. Thus, it is possible to ensure the flow velocity of dilution air in the gap G3, and it is possible to suppress that the premixed gas flows back into the gap G3.

(6) In some embodiments, in any one of the above configurations (1) to (5), at least some oblique holes 111 of the plurality of oblique holes 111 are preferably disposed in a region of the base plate 100 overlapping outlet openings 69e of the premixing tubes 66, when viewed from a downstream side.

With the above configuration (6), the oblique hole 111 is arranged at a position relatively close to the region where the flow velocity of the dilution air tends to decrease, the dilution air blown out from the oblique hole 111 easily flows into the region where the flow velocity of the dilution air tends to decrease. Thus, it is possible to suppress the decrease in flow velocity of dilution air in the region, and it is possible to suppress that the premixed gas flows back into the region.

(7) A gas turbine 1 according to at least one embodiment of the present disclosure includes: the gas turbine combustor 4 having any one of the above configurations (1) to (6).

With the above configuration (7), it is possible to suppress the damage to the gas turbine combustor 4 and it is possible to improve the reliability of the gas turbine 1.

REFERENCE SIGNS LIST

1 Gas turbine
4 Gas turbine combustor (combustor)
46 Combustor liner
47 Combustor basket
56 Pilot cone portion
57 Pilot burner cylinder
60 Premix combustion burner (main combustion burner)
65 Extension section
66 Main burner cylinder (premixing tube)
67 Premixing passage
68 Outlet portion
69 Outlet opening forming portion
69e Outlet opening
100 Base plate
106 Premixing tube support hole
110 Air hole
111 Oblique hole
111A First hole
111B Second hole

The invention claimed is:

1. A gas turbine combustor, comprising:
   a tubular member;
   a plurality of premixing tubes circumferentially arranged on an inner side of the tubular member, each of the plurality of premixing tubes forming an outlet portion of a premixing passage; and
   a base plate for supporting the plurality of premixing tubes,
   wherein the base plate has:
      a plurality of through holes disposed corresponding to the plurality of premixing tubes, respectively, and allowing the premixing passage to pass through the base plate; and
      a plurality of oblique holes extending obliquely with respect to an axial direction of the gas turbine combustor in a region different from a region where the through holes are disposed,
   wherein the plurality of oblique holes includes first holes, each first hole being positioned radially outward of a central position of a corresponding one of the plurality of through holes, and each first hole extending obliquely with respect to the axial direction and radially outward from an upstream end toward a downstream end, and
   wherein each of the first holes extends obliquely with respect to the axial direction and when viewed from outside in a radial direction of the gas turbine combustor toward a central position of an outlet opening of a corresponding one of the premixing tubes among the plurality of premixing tubes from the upstream end toward the downstream end.

2. The gas turbine combustor according to claim 1,
   wherein the plurality of oblique holes include second holes each of which is positioned radially inward of a central position of a corresponding one of the plurality of through holes, and extends obliquely with respect to the axial direction and radially inward from an upstream end toward a downstream end.

3. The gas turbine combustor according to claim 2,
   wherein each of the second holes extends obliquely with respect to the axial direction and when viewed from the outside in a radial direction of the gas turbine combustor toward a central position of an outlet opening of a corresponding one of the premixing tubes among the plurality of premixing tubes from the upstream end toward the downstream end.

4. The gas turbine combustor according to claim 1,
   wherein at least some oblique holes of the plurality of oblique holes are disposed in a region of the base plate overlapping outlet openings of the premixing tubes, when viewed from a downstream side.

5. A gas turbine, comprising:
   the gas turbine combustor according to claim 1.

* * * * *